(12) United States Patent
Sieber et al.

(10) Patent No.: US 11,485,264 B2
(45) Date of Patent: Nov. 1, 2022

(54) SITTING CONCEPT FOR AUTONOMOUS DRIVING WITH INCREASED COMFORT ASPECTS IN A SANDWICH CONSTRUCTION

(71) Applicant: Dr. Ing. h.c. F. Porsche Aktiengesellschaft, Stuttgart (DE)

(72) Inventors: Volker Sieber, Karlsbad (DE); Christoph Kutscheid, Gerlingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 176 days.

(21) Appl. No.: 17/068,986

(22) Filed: Oct. 13, 2020

(65) Prior Publication Data
US 2021/0107387 A1 Apr. 15, 2021

(30) Foreign Application Priority Data
Oct. 14, 2019 (DE) .................. 10 2019 127 572.5

(51) Int. Cl.
| | | |
|---|---|---|
| *B60N 2/68* | (2006.01) | |
| *B60N 2/90* | (2018.01) | |
| *B60R 22/20* | (2006.01) | |
| *B60N 2/66* | (2006.01) | |
| B60R 22/18 | (2006.01) | |
| B60N 2/02 | (2006.01) | |
| B60R 22/26 | (2006.01) | |

(52) U.S. Cl.
CPC ............. *B60N 2/914* (2018.02); *B60N 2/66* (2013.01); *B60N 2/688* (2013.01); *B60N 2002/0268* (2013.01); *B60N 2205/30* (2013.01); *B60R 22/26* (2013.01); *B60R 2022/1818* (2013.01); *B60R 2022/207* (2013.01)

(58) Field of Classification Search
CPC .......... B60N 2/914; B60N 2/58; B60N 2/976; B60N 2/688; B60R 2022/207
See application file for complete search history.

(56) References Cited

U.S. PATENT DOCUMENTS

| | | | | |
|---|---|---|---|---|
| 5,232,264 A * | 8/1993 | Hoshihara | ............ | B60N 2/4249 297/344.1 |
| 5,556,169 A * | 9/1996 | Parrish | .................. | B60N 2/803 5/655.4 |
| 5,617,595 A * | 4/1997 | Landi | ................. | A61G 7/05784 428/116 |
| 5,765,915 A * | 6/1998 | Lee | ...................... | B60N 2/0232 297/284.6 |
| 8,801,104 B2 * | 8/2014 | Di Giusto | ................ | B60N 2/70 297/284.6 |
| 10,144,320 B2 | 12/2018 | Patterson et al. | | |

(Continued)

FOREIGN PATENT DOCUMENTS

| | | |
|---|---|---|
| CN | 201907442 U | 7/2011 |
| DE | 19654553 A1 | 7/1997 |

(Continued)

*Primary Examiner* — Timothy J Brindley
(74) *Attorney, Agent, or Firm* — RatnerPrestia (57) ABSTRACT

A seat for a motor vehicle includes a basic shell and a seat surface. The seat surface includes a vacuum layer and an air cushion layer; and the air cushion layer is arranged between the vacuum layer and the basic shell. Also disclosed is a motor vehicle having such a seat.

4 Claims, 14 Drawing Sheets

(56) References Cited

U.S. PATENT DOCUMENTS

| | | | | |
|---|---|---|---|---|
| 2005/0218710 | A1* | 10/2005 | Browne | A47C 31/11 |
| | | | | 297/452.64 |
| 2010/0314929 | A1* | 12/2010 | Hsu | A47C 27/146 |
| | | | | 297/452.48 |
| 2011/0227378 | A1* | 9/2011 | Swierczewski | B60N 2/4279 |
| | | | | 297/216.1 |
| 2011/0272979 | A1* | 11/2011 | Franz | B60N 2/646 |
| | | | | 29/407.01 |
| 2011/0272993 | A1* | 11/2011 | Kilincsoy | D04B 21/14 |
| | | | | 297/452.41 |
| 2015/0217720 | A1* | 8/2015 | Palaniappan | B60R 22/26 |
| | | | | 280/804 |
| 2016/0207429 | A1* | 7/2016 | Fitzpatrick | B60N 2/646 |
| 2018/0118054 | A1 | 5/2018 | Devilbiss et al. | |
| 2018/0187348 | A1* | 7/2018 | Mueller | B32B 5/026 |
| 2020/0079317 | A1* | 3/2020 | Jaradi | B60R 22/1958 |
| 2020/0223326 | A1* | 7/2020 | Tanaka | B60N 2/853 |
| 2020/0238874 | A1* | 7/2020 | Mazzucchelli | B60N 2/914 |
| 2020/0338853 | A1* | 10/2020 | Mueller | B32B 9/025 |

FOREIGN PATENT DOCUMENTS

| | | | | |
|---|---|---|---|---|
| DE | 19910427 | A1 | 9/2000 | |
| DE | 102007026368 | A1 | 12/2008 | |
| DE | 102016218665 | A1 | 3/2017 | |
| DE | 102018209435 | A1 * | 12/2019 | |
| DE | 102019120517 | A1 * | 2/2021 | |
| DE | 102020128906 | A1 * | 5/2022 | |
| FR | 2695893 | A1 * | 3/1994 | B60R 22/20 |
| WO | WO-2014093266 | A1 * | 6/2014 | B60N 2/688 |
| WO | WO-2018184660 | A1 * | 10/2018 | |

* cited by examiner

Fig. 9 small

Fig. 10 large

SITTING CONCEPT FOR AUTONOMOUS DRIVING WITH INCREASED COMFORT ASPECTS IN A SANDWICH CONSTRUCTION

CROSS-REFERENCE TO RELATED APPLICATION

This application claims priority to German Patent Application No. 10 2019 127 572.5, filed Oct. 14, 2019, the content of such application being incorporated by reference herein in its entirety.

FIELD OF THE INVENTION

The present invention relates to a seat for a motor vehicle. The present invention furthermore relates to a motor vehicle having such a seat.

BACKGROUND OF THE INVENTION

A very wide variety of seats for the occupants of motor vehicles are proposed depending on the type of vehicle used and the differentiation between driver's seat and passenger seats and depending on the equipment level. The driver's seat is generally located on the side facing the oncoming traffic; the steering and control instruments are opposite said seat. Depending on the equipment level, front seats of passenger vehicles are upholstered to a greater or lesser extent or are provided with ergonomic formations and head restraints. At higher equipment levels and especially in the case of sports vehicles, the backrests are sometimes curved laterally in order to absorb the lateral centrifugal forces acting on the upper body during cornering, for the purpose of better lateral support.

The extent and differentiation of the seat adjustment are largely dependent on the comfort and equipment level and extend from what are referred to as linear or two-way over four-way to six-way systems in the prior art. In the case of an electrical adjustment, sometimes a plurality of different seat settings can be stored electronically and activated in order to change them ("memory function"). Especially for frequent and professional drivers, the seats protect the human movement apparatus against unilateral and therefore debilitating loads and unhealthy sitting positions.

Current seats make reference to the ball of the foot or heel for positioning individuals of differing height on the driver's seat. This produces a certain hip point range (H point) in order to ensure the ergonomically required movement space for the seat.

According to the prior art, the adjustment is typically made possible by means of a kinematic system which, using multiple joints, makes it possible to position a frame with a backrest vertically and to move same longitudinally on rails.

The advantageously low-lying H point makes it possible to select the "pack size", which is defined by the lower edge of the rails to the lower boundary line of the seat adjustment area, to be as small as possible. This gives rise—in particular in view of the floor structure which is raised because of the battery in electric vehicles—to the circumstance in which comparatively little construction space is available for the kinematics.

A modern sitting concept for autonomous driving observes positioning via a standard centering of the shoulders of the occupants. This is associated with the requirement for a greater height adjustment of the seat cushion. The adjustable distance here, with the same pack size, is approx. 30% more than these current sitting concepts. In addition, the required increase in the structure has a considerable effect on the loads to be taken into consideration in the event of a collision.

The additional inclination of the backrest in a relaxed and reclining position is an additional challenge for the configuration of the entire system. The integration of belt systems in the seat structure (GIS) that is necessary for an extensive tilting movement counter to the direction of travel amplifies the problem of a complicated structure and leads to heavy and mechanically complex systems.

DE 19910 427 A1, which is incorporated herein by reference, discloses a passenger seat which is formed with pneumatically regulable and reversibly deformable vacuum cushions. Elastic, dimensionally stable basic upholstery is first of all arranged on a seat frame. The basic upholstery has recesses for receiving at least one vacuum cushion. The filling of the vacuum cushion can be regulated with a motor-driven extraction pump via valves. The vacuum cushion is furthermore provided with separate segments, wherein the segments are filled with air-permeable upholstered bags containing a free-flowing bulk material.

US 2018/0118054 A1, DE 10 2016 218 665 A1, CN 201907442 U, DE 10 2007 026 368 A1 and DE 196 54 553 C2, which are each incorporated herein by reference in their entirety, disclose alternative solution approaches for pneumatically regulating the seat surface of a vehicle seat.

SUMMARY OF THE INVENTION

Described herein is a seat for a motor vehicle and a motor vehicle having such a seat according to the independent claims.

The proposed solution is based on a sitting concept for autonomous driving with increased comfort aspects. A concept of the invention consists in the construction of the seat according to a "sandwich" arrangement from a basic shell, an air cushion layer and a vacuum layer. The vacuum layer is filled with granules. By means of extraction or inflation, the vacuum layer therefore permits optimum adaptation of the seat surface to different physical circumstances. Further aspects include the arrangement of a tree structure layer on the vacuum layer.

An advantage of the seat according to aspects of the invention resides in the reduced complexity of its kinematic systems, permitting a cost reduction because of the consequential separation of functions in the construction, optimization of construction space, reduction in weight because of the consequent lightweight design and increased durability in view of the fewer mechanical parts.

A further advantage of the seat resides in its functionality in conjunction with intelligent body adaptation permitting an increase in comfort of the diverse seat functions, individual adaptation to body shapes in all possible sitting positions, automatic referencing of the driving position for all body heights, increased road safety, dynamic hardness regulation of the seat surface, ergonomic improvement in respect of the health of the occupants, increasing the well-being thereof, an optional orthopedic sitting function and an expansion in the target group because of greater adaptability.

Further advantageous refinements of the invention are specified in the dependent patent claims.

BRIEF DESCRIPTION OF THE DRAWINGS

Exemplary embodiments of the invention are illustrated in the drawings and will be described in more detail below.

DETAILED DESCRIPTION OF THE INVENTION

Figure 1:
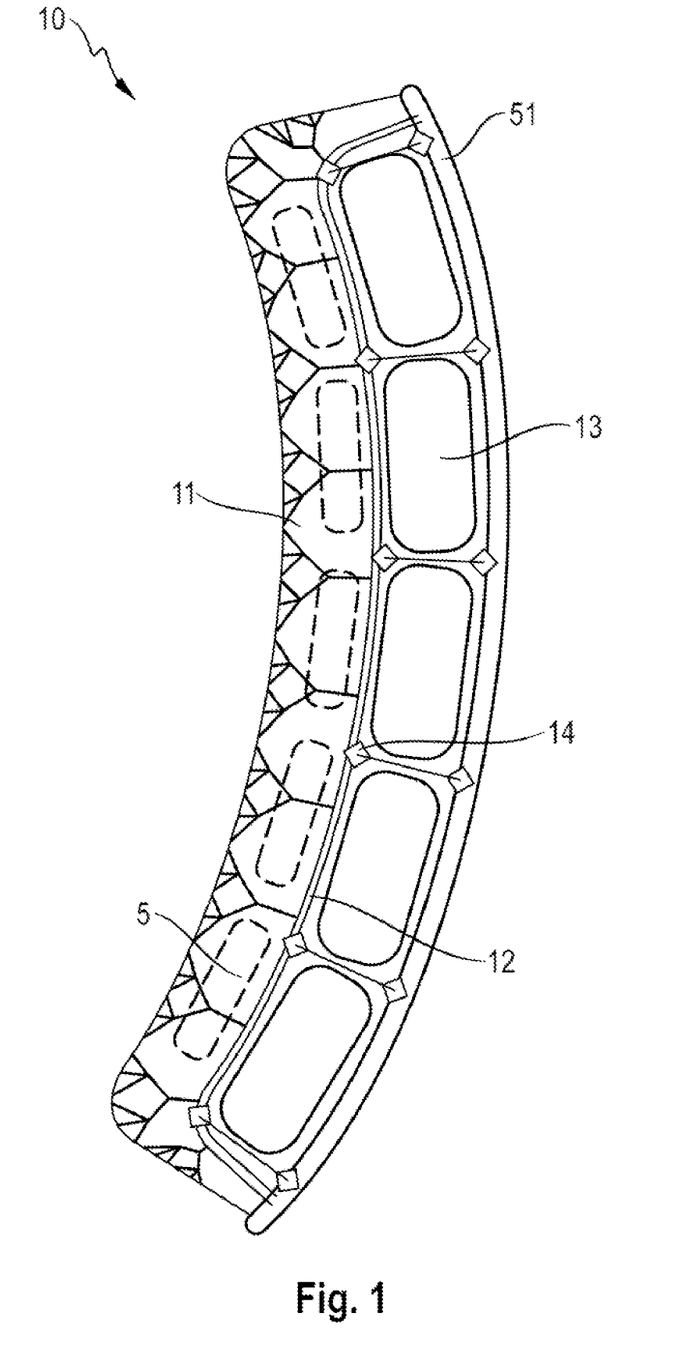
FIG. 1 shows the longitudinal section of a seat according to a first embodiment.

FIG. 1 illustrates the basic structure of features of a seat (10) according to aspects of the invention. It is already possible to see here an outer or basic shell (51) which is mounted pivotably on a positionally fixed frame in the vehicle structure and which, in combination with an inner vacuum layer (12), which serves as a stabilizing mattress, with a cushion support lying in-between, fulfils the sandwich function. The inner, contour-providing layer (15) having a variable shaping function gives the seat (10) its individual fit and permits the seat to be adapted to very different body heights and to stabilize bodies. A form fit is produced in said layer passively (when sitting down) or variably by means of active adaptation, for example with gas- or liquid-filled elements.

The contour layer (15) therefore as it were fulfils the function of a cushion support (2) and in this way provides an individually perfect support in the seat (10) by the respectively set fit being stiffened in accordance with the sandwich principle. The assembly having variable contours in such a way comprises, in addition to the stiff outer shell (51) with the inner volume-adjustable cushion support (2), a sensor network (14) which runs through the sandwich. The sensor network senses the relative position of the vacuum layer in relation to the shell.

The sitting comfort is decisively determined by the upper side of the vacuum layer (12), said upper side being oriented with respect to the user's body. Said vacuum layer is therefore preferably covered by a tree structure layer or body contact layer (11) which is climatized by active extraction of air and supply of air, but is at least passively ventilated and which can be supplemented by a physiologically active layer (5) which is capable of serving for local massage or of having other kinetic elements. The body-oriented force actions of said physio-active layer (5) provide optimum resistance to the stiff vacuum layer (3).

Figure 2:
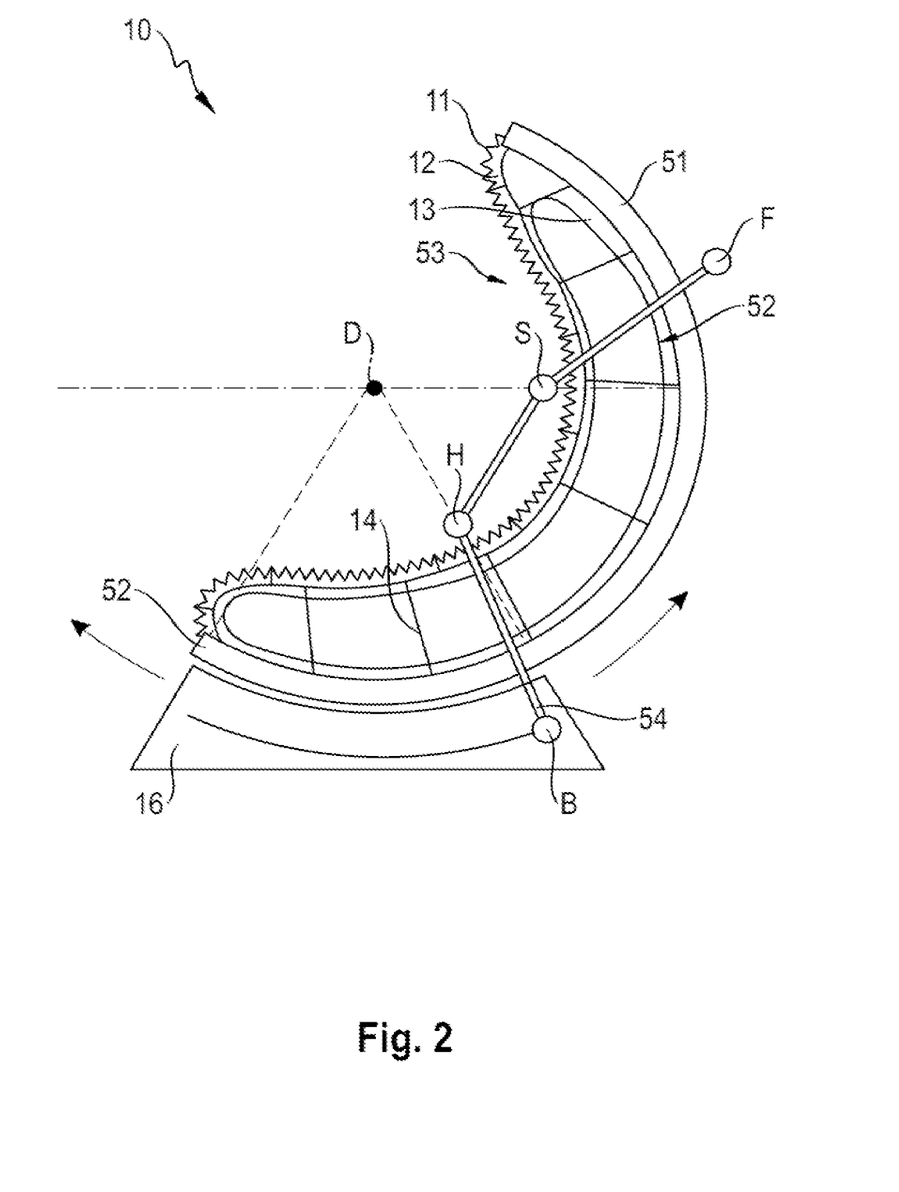
FIG. 2 shows the longitudinal section of a seat according to a second embodiment.

The functional principle of the seat (10) that is illustrated in FIG. 2 is based here on a seat adjustment that is uniform for all body types, by means of the basic shell (51) which is mounted on the frame so as to be pivotable or rotatable about a pivot axis (D) located at shoulder height. As per the figure, the contour layer (15) which serves as a shape-providing support and is constructed here from multiple layers is composed of said vacuum layer (12), an air cushion layer (13) for adaptation to the user's body height and shape, and of the sensor network (14).

The seat surface (53) which is essential for comfort is formed here by the above-described tree structure layer or body contact layer (11), an integrated system for ventilating the layer (11) and the additional physio-active layer (5).

Figure 3:
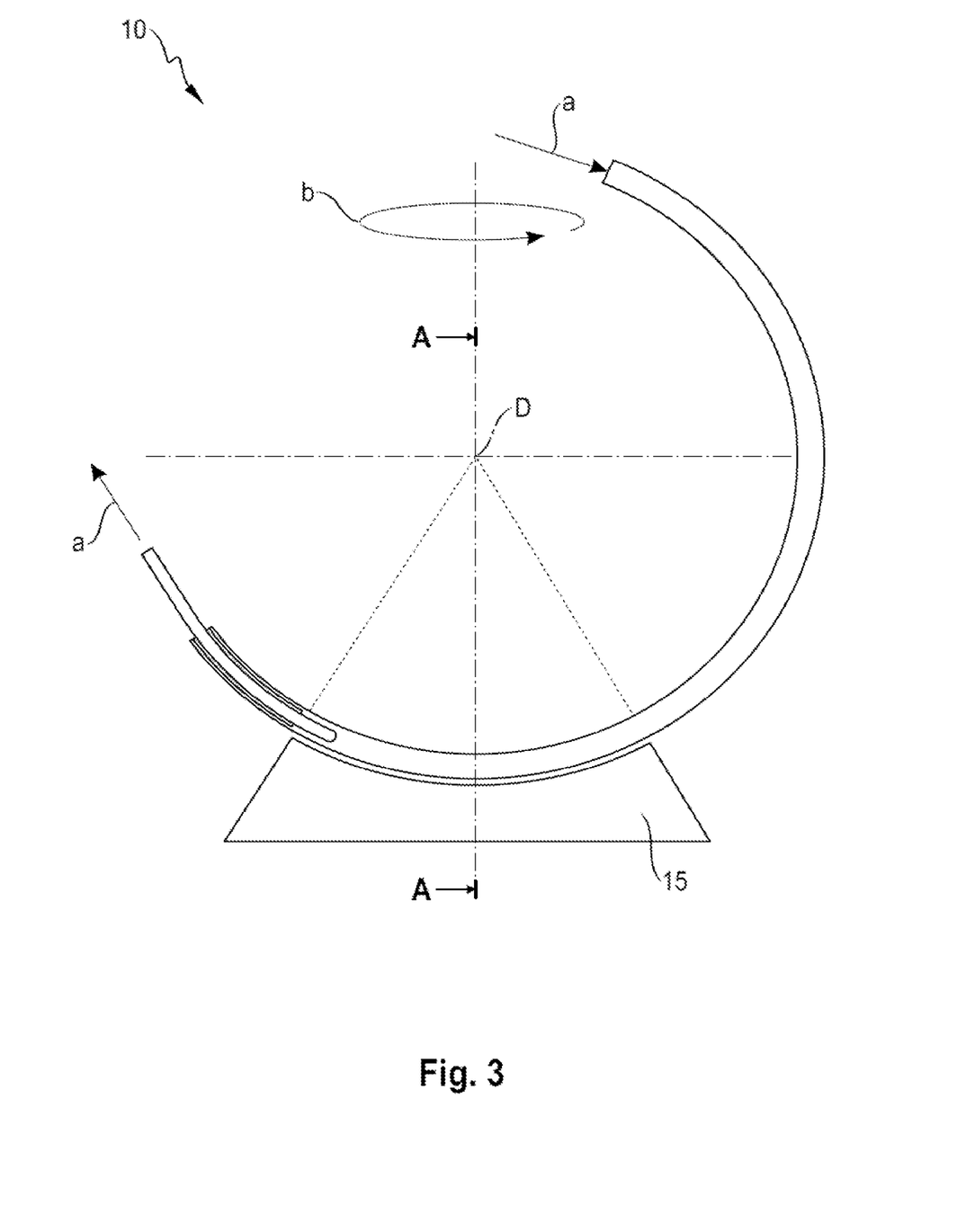
FIG. 3 shows a simplified longitudinal section of the seat according to FIG. 2 without a seat surface.
Figure 4:
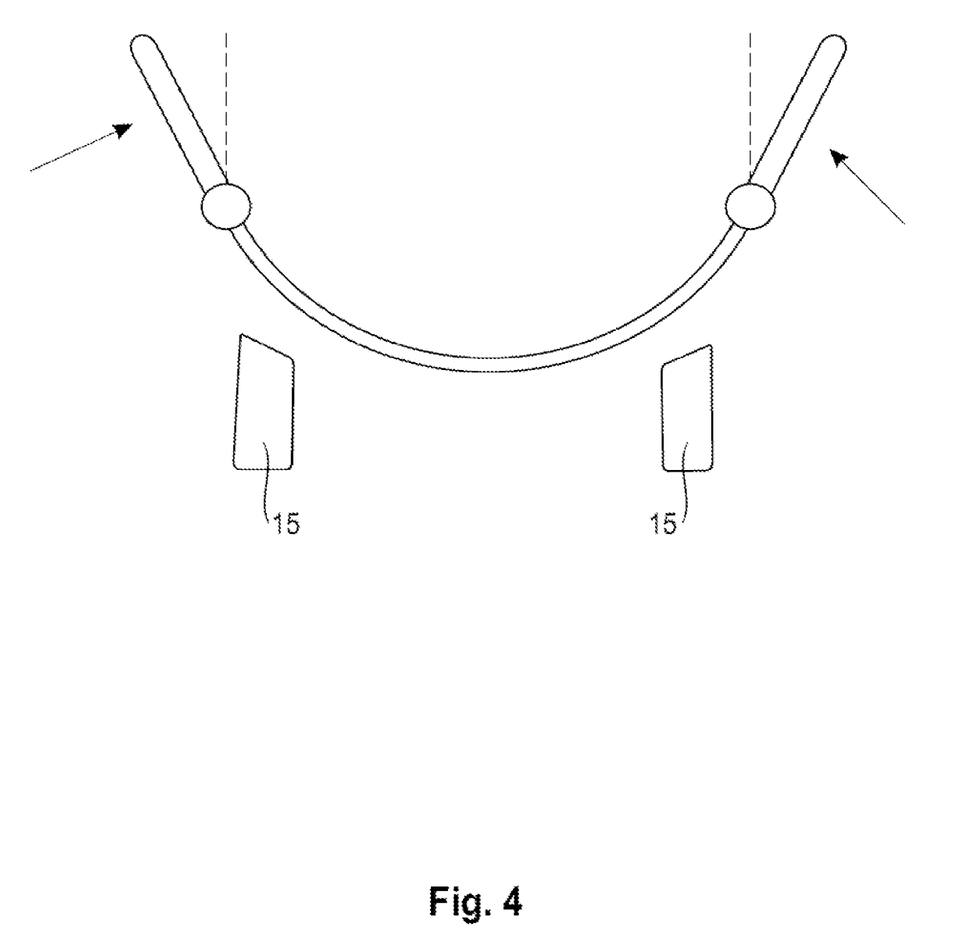
FIG. 4 shows a section in the plane A-A according to FIG. 3.

FIG. 3 illustrates how, in a refinement of the invention, even the most different bodies are stabilized by an individual form fit. As is revealed in the drawing, the basic shell (51—FIG. 1) is mounted for this purpose so as to be (a) pivotable in the X direction relative to the frame (16) and (b) rotatable relative to the Z direction, which provides the seat surface (53—FIG. 1) with a variable length. This pivotable mounting makes it possible for the basic shell (51) to take up three different positions which, depending on the application, set the vehicle occupant into a drive position, work position or relaxed position. The variable width of the basic shell (51), said width being marked by arrows in FIG. 4, permits the adaption of the side support.

Figure 5:
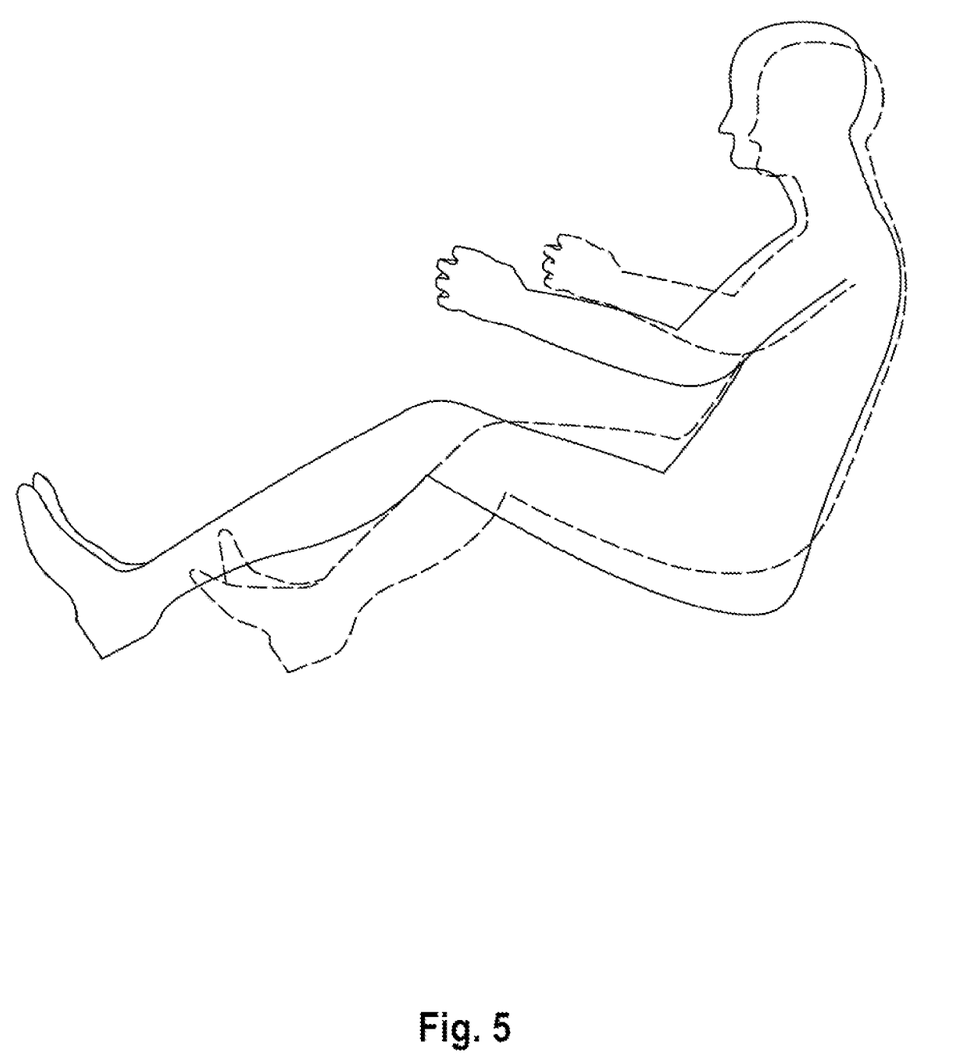
FIG. 5 shows the side view of the occupant of a vehicle in the drive position in alternative body heights.

FIG. 5 documents the central requirements imposed on the contour layer (52) that has already been outlined in the explanations regarding FIGS. 1 and 2: the structure for each body shape is intended to provide a stable support with pleasant sitting comfort and is intended to be correspondingly adaptable to sitting postures of all use cases. Furthermore, owing to the shoulder-centered position of drivers of differing height, an extended seat setting is desirable to compensate for the difference (16) in height and leg length. Finally, depending on the use case, either comfort or support and safety are paramount in order to achieve maximum performance and individualization.

Figure 6:
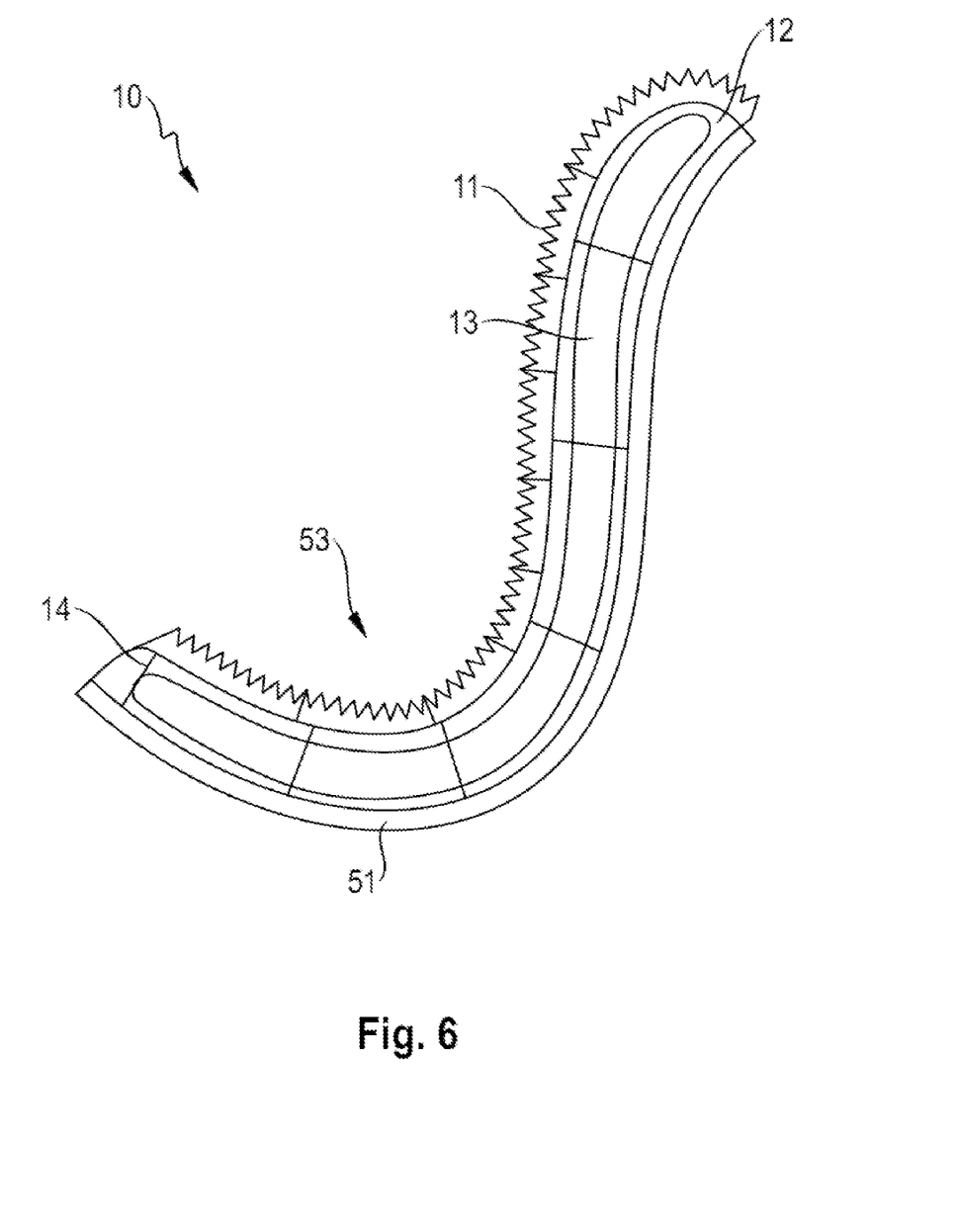
FIG. 6 shows the longitudinal section of a seat according to a third embodiment.
Figure 7:
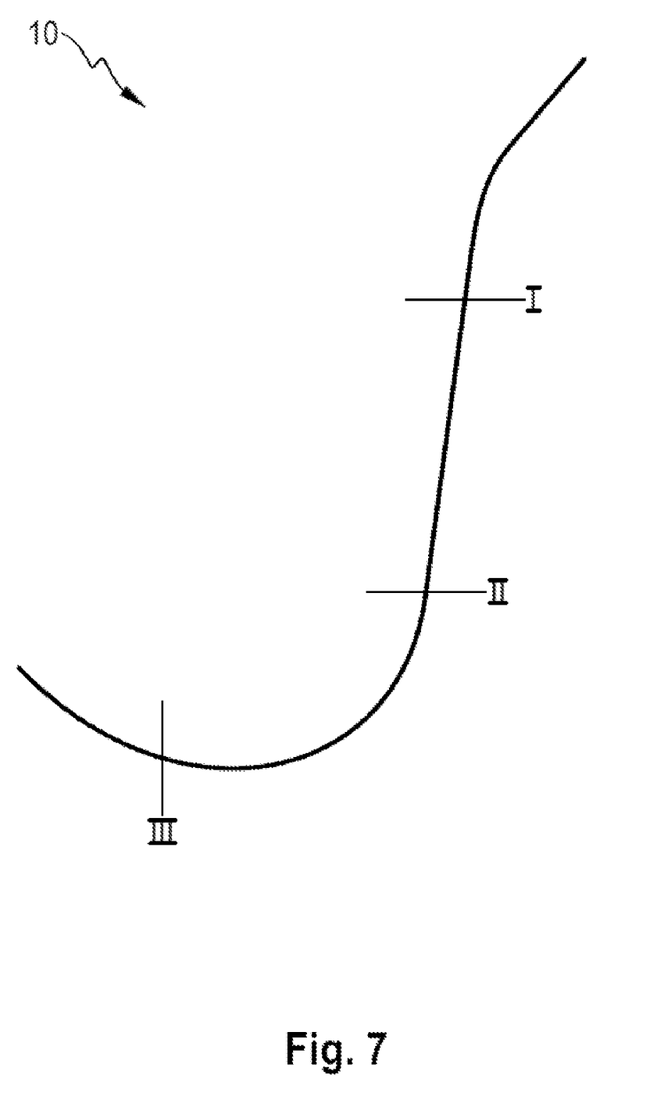
FIG. 7 shows schematically the simplified longitudinal section of the seat.
Figure 8:
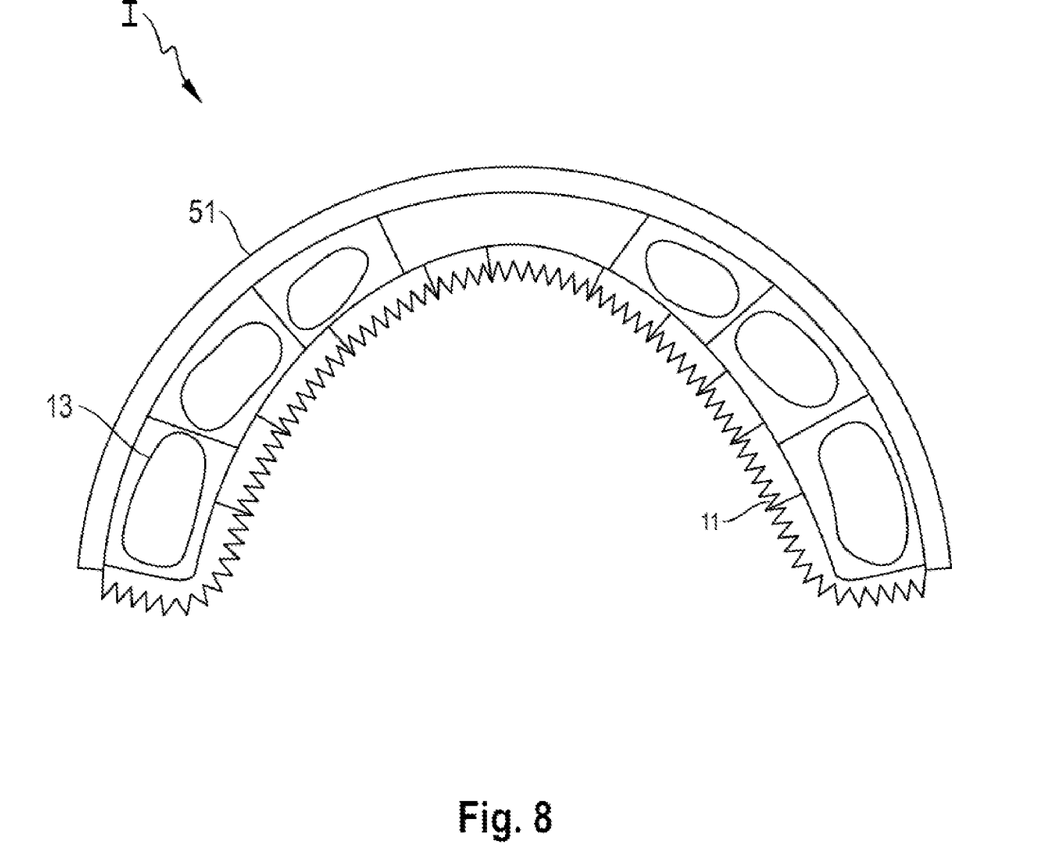
FIGS. 8-11 show sections of the seat in the planes I, II and II according to FIG. 7.
Figure 9:
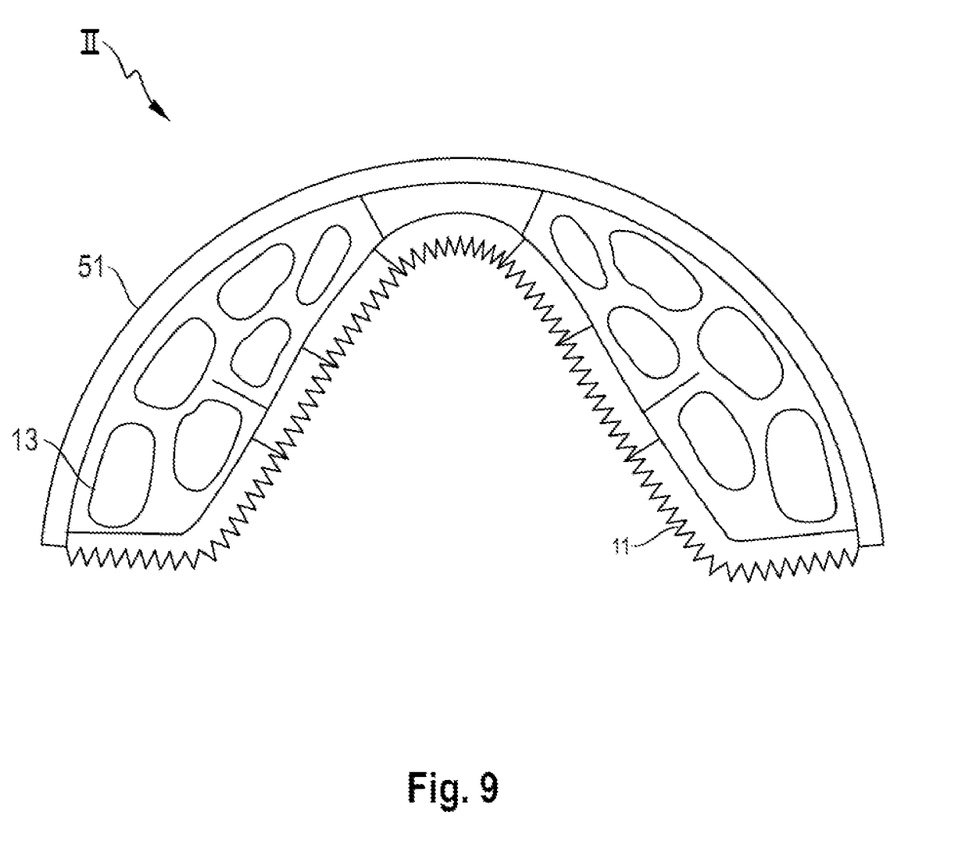
Figure 10:
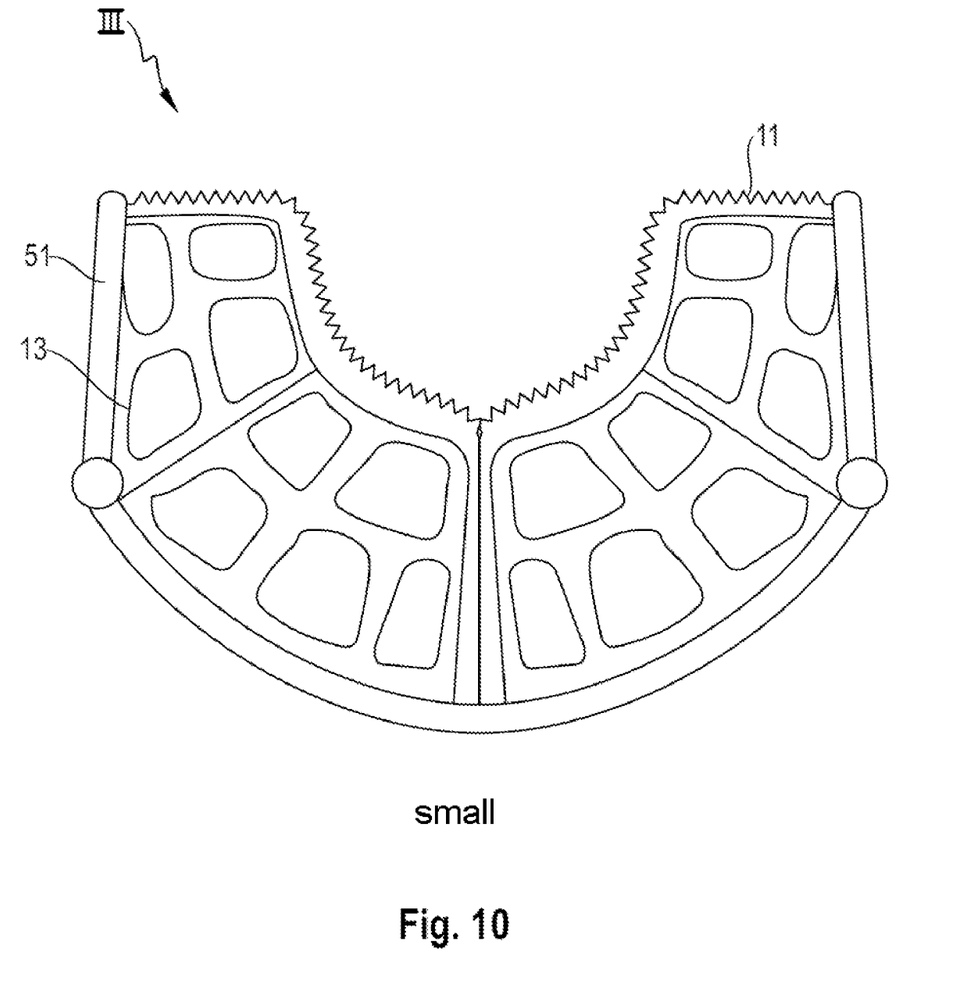
Figure 11:
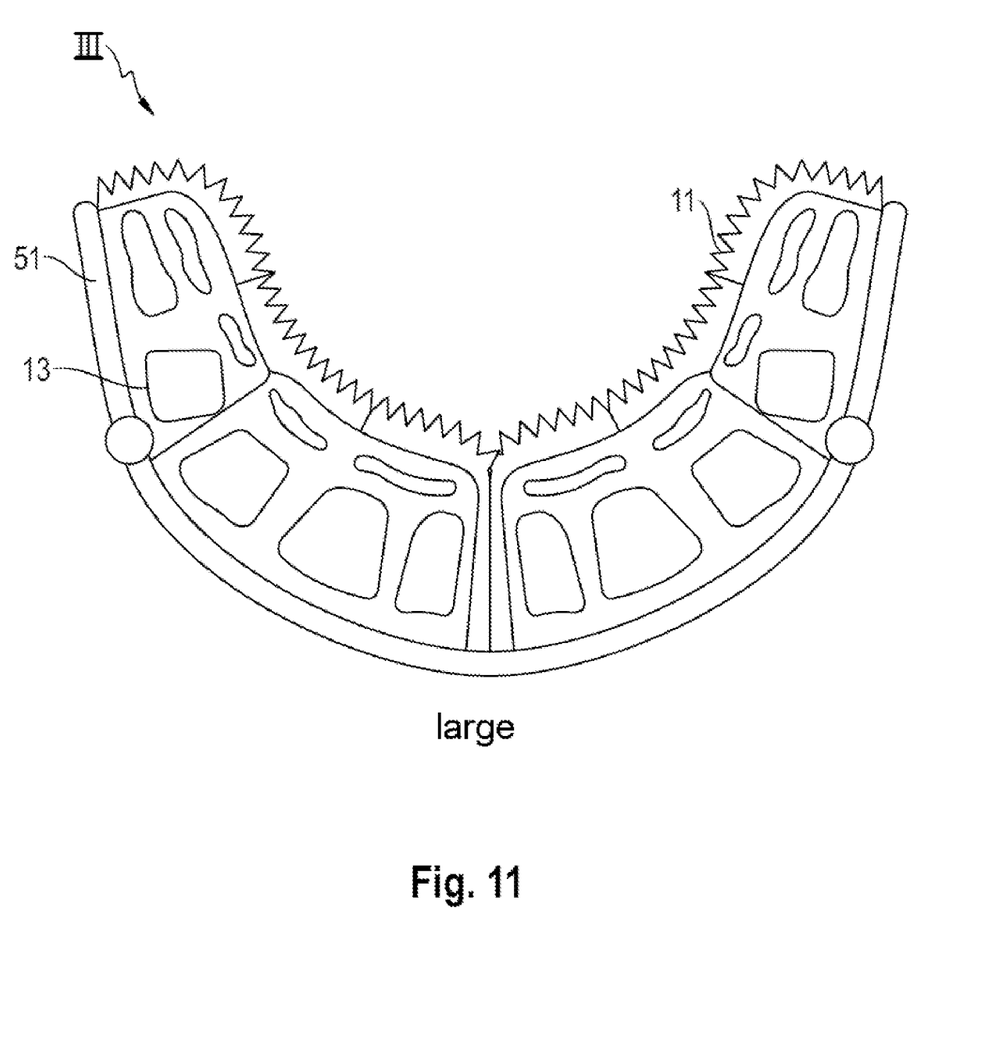
Figure 12:
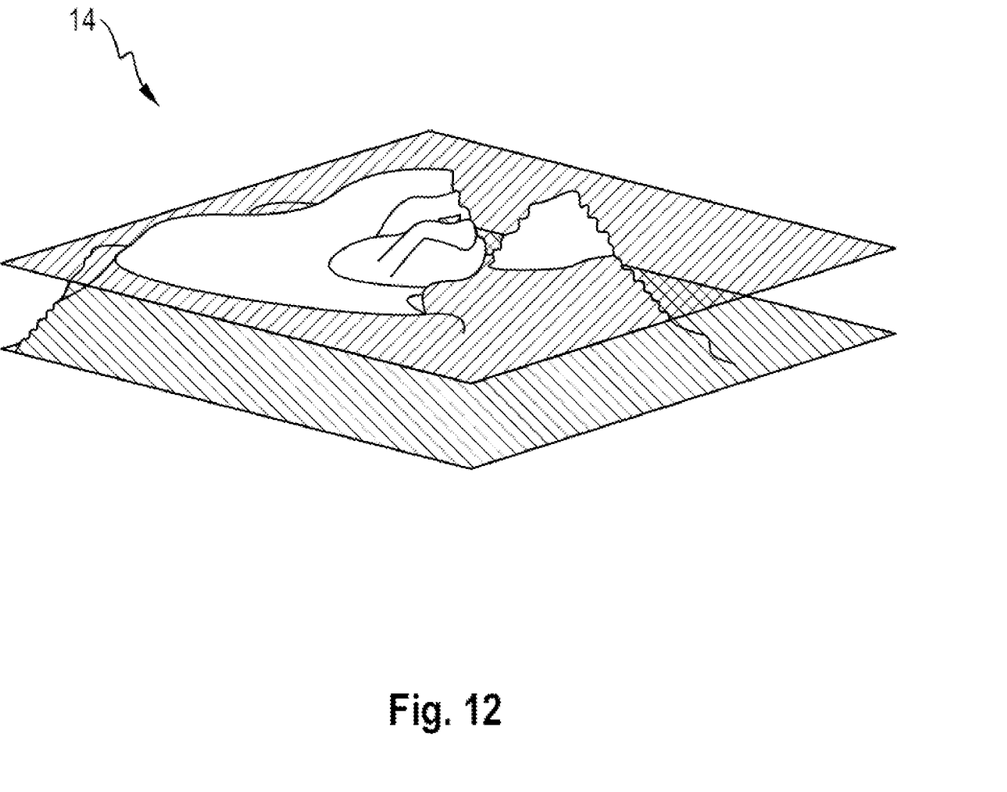
FIG. 12 shows a pressure diagram obtained by means of a sensor network.

Further details of seat surface (53) and mattress concept are illustrated by FIGS. 6 to 11. As especially FIG. 6 shows, the air cushion layer (13) is supported on the basic shell (51) and lies over the full surface against the latter. A height regulation that is adapted to extremely different drivers is made possible by inflation of the air chambers of said air cushion layer in accordance with the operative principle of a "breathing shell". Depending on the seat area, different distances between minimum and maximum pressurization are possible here. A single- or multi-layered structure is applicable. The sensor network (14) which is likewise marked in FIG. 6 and which runs through the entire seat surface (53) measures the internal pressure of the air cushion and, on the basis thereof, identifies the distribution (see FIG. 12) and possible shifting of the weight loading the seat (10). The regulation of the air cushion internal pressure and the sensing of temperature, cardiovascular system and body proportions and postures of changing occupants are also carried out by the sensor network (14). In a preferred variant, the sensor network (14) also automatically regulates the adaptation to different body shapes by means of the vacuum layer (12) which, in an innervated state, stabilization of the shape once the latter has been taken up.

Figure 13:
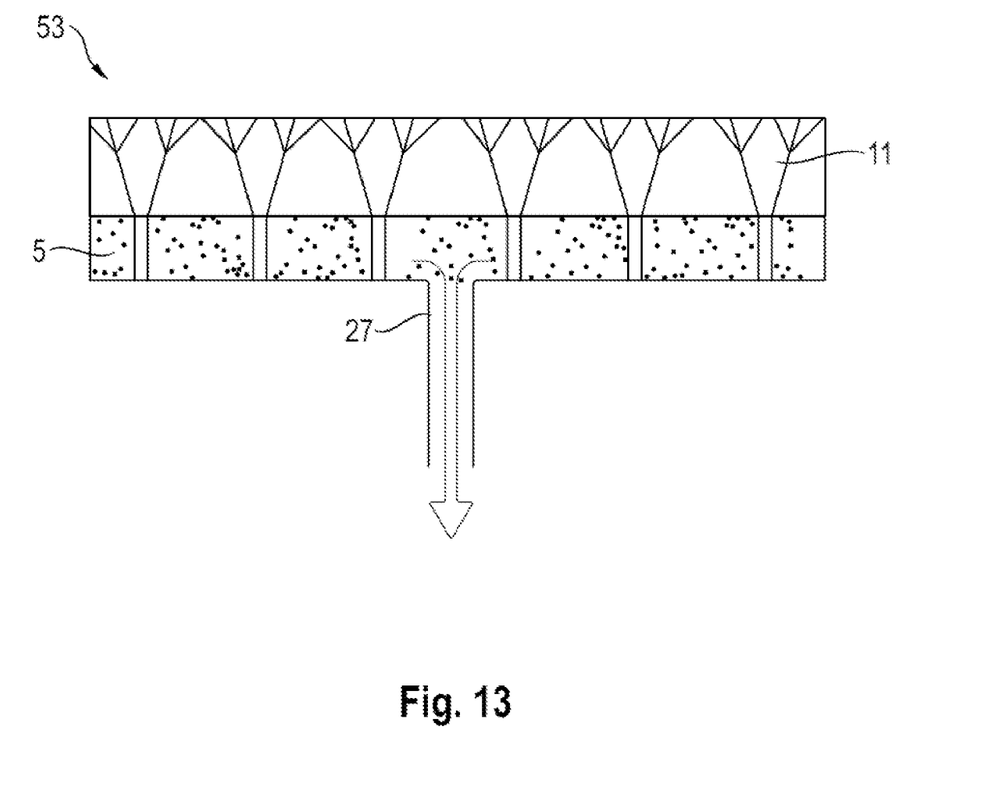
FIG. 13 shows an enlarged section of the seat surface.

FIG. 13 illustrates the function of the seat surface (53) which is decisive for the comfort. The physio-active layer (5) here provides for the activation or relaxation of the body during prolonged sitting. Local regions are simulated by means of massage. Kinetic elements counteract fatigue by slowly changing the sitting posture. An active venting system (27) in this layer provides comfort by means of air conditioning and active transporting away of moisture.

The tree structure layer (11) denoted in the same FIG. serves for optimally adapting the seat (10—FIG. 1) to the comfort needs of the driver. Said comfort layer consisting of flexible elements oriented orthogonally to the surface branches out from a trunk via branches into individual twigs and, in conjunction with the stabilized vacuum layer (12), permits a dynamic distribution of pressure from its structure. For this purpose, the tree structure distributes the weight ideally in the manner of a space lattice which is stiffened in relative terms from small to large and thus comfortably absorbs forces.

Figure 14:
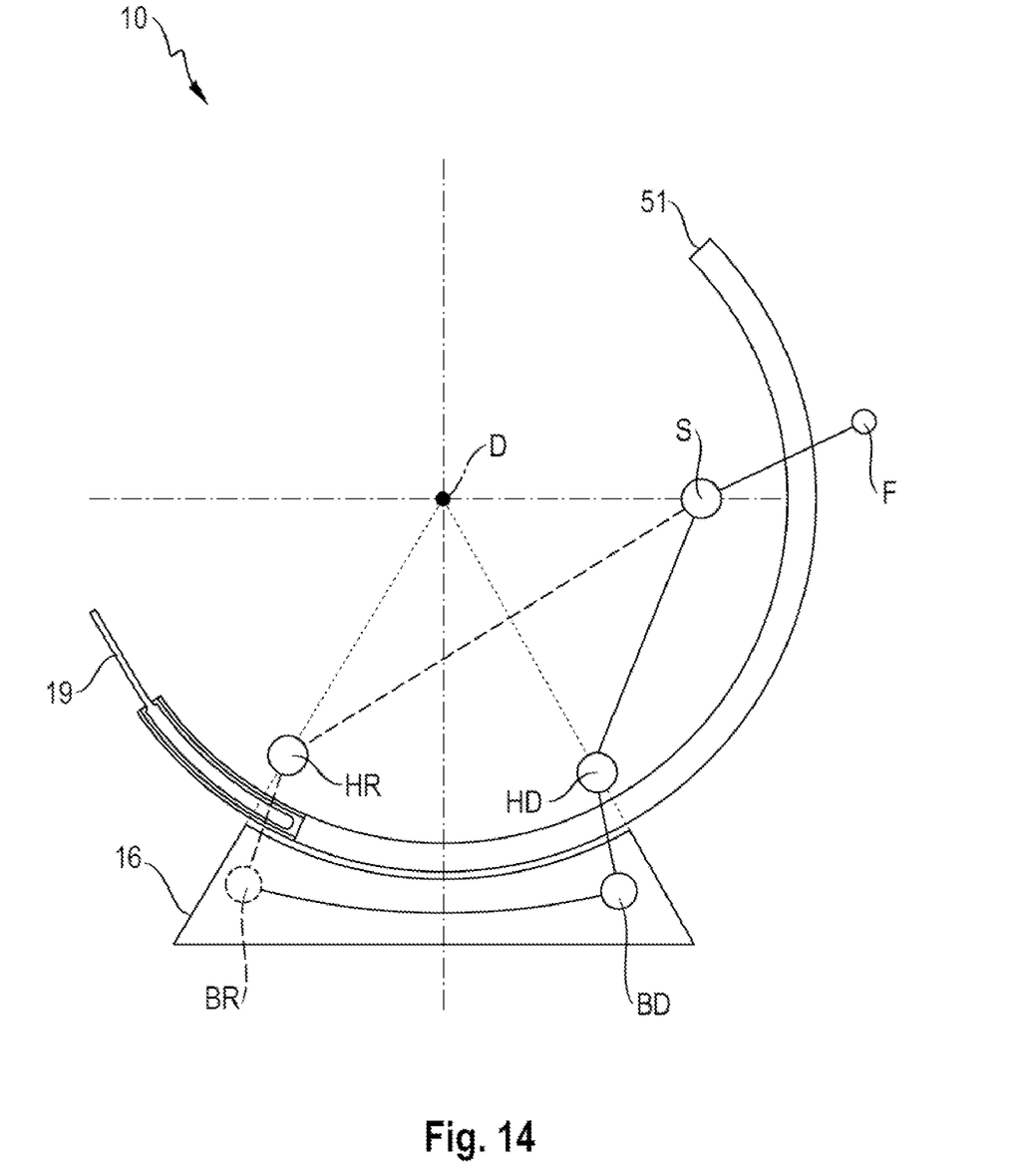
FIG. 14 shows, in an illustration corresponding to FIG. 3, the seat according to the second embodiment extended by a belt system.

A belt system which is illustrated finally in FIG. 14 and is decoupled mechanically from the basic shell (51) is fastened to a fastening point (B) of the frame (16) and to a fixing point (F) of the vehicle structure. The seat belt has to be carried along in the region of the pelvis during the rotational movement of the seat (10) in order to guarantee the safety of the occupant. The fastening point (B) therefore follows possible pivoting movements of the basic shell (51) in order to be able to maintain its relative position with respect to the hip point (H) even during an absolute change thereof. The basic frame (16) is for its part connected in a positionally fixed manner to the vehicle structure, guides the basic shell (51) and therefore assists the rotations required for taking up a desired sitting position. Via two parallel basic supports or rails, this sitting concept permits pivoting with an angle of inclination of the back rest of 17° to 55° with respect to the vertical axis. The shoulder-centered pivot point (D) optionally permits a connection, which is known from conventional belt systems, to the B pillar of the vehicle or deflection about the B pillar of the vehicle.

What is claimed:

1. A seat for a motor vehicle comprising:
a frame,
a basic shell and a seat surface,
wherein the seat surface comprises a contour layer comprising a vacuum layer and an air cushion layer,
wherein the air cushion layer is arranged between the vacuum layer and the basic shell,
wherein the basic shell is pivotable about a pivot point (D) at shoulder height (S) with respect to the frame between a relaxed position and a drive position,
wherein the seat has a belt system, and the belt system is connected to the frame at a fastening point (B),
wherein the basic shell is configured to be mounted rotatably with respect to a yaw axis of the motor vehicle,
wherein the seat is configured such that occupants of the vehicle take up a first hip position (HD) in the drive position and a second hip position (HR) in the relaxed position, and
wherein the fastening point (B) of the belt system is adapted (BD, BR) to the respective hip position (HD, HR).

2. The seat as claimed in claim 1, wherein:
the seat surface furthermore comprises a comfort layer comprising a lattice structure layer.

3. The seat as claimed in claim 1, wherein:
the seat surface furthermore comprises a sensor network that runs through the seat surface.

4. A motor vehicle having the seat as claimed in claim 1.

* * * * *